bows C into separate portions which are heated to different temperatures by the pipes —$c^4$—$c^3$—$c^2$—$c'$—$c$— arranged within said chambers for conducting the distilled vapors. As the stream of ammonia liquor flows to the chamber —$b^3$— which is evidently of higher temperature than the chamber —$b^4$—, a considerable amount of carbonic anhydride and sulphureted hydrogen is evolved, and these gases pass through the outlet tube —1— extending into the chamber —$b^4$— and under the cap or passette —2— and through the ammonia liquor in the cooler chamber —$b^4$—, thus effecting the absorption of a great amount of the ammonia also evolved in said chamber —$b^3$— at the same time as the carbonic anhydride and sulphureted hydrogen gases. The gases evolved in the chambers —$b^2$— —$b'$—$b$— of successively greater temperature than the chamber —$b^3$— are successively passed through the chambers of less temperature until they reach the chamber —$b^4$— or are absorbed by the liquor within the chambers —$b^3$—$b^2$—$b'$—. The gases within the chamber —$b^4$— then pass from the pipe —3— through the comparatively cool ammonia liquor in the washer —H— and if any ammonia is carried through the pipe —3— it is absorbed by the comparatively cool ammonia liquor in said washer. The carbonic anhydride and sulphureted hydrogen gases then pass from the washer —H— through the pipe —4— and if desired in order to further obviate the escape of the ammonia, the pipe —4— may be discharged into an acid washer which will further prevent the escape of ammonia.

My improved apparatus will be readily understood from the foregoing description and upon reference to the drawing, and it will be evident to one skilled in the art, that it is extremely applicable in concentrating the weak ammonia liquor produced in manufacturing illuminating gas, and is also applicable for many other purposes.

Having thus fully described my invention, what I claim as new, and desire to secure by Letters Patent, is—

1. The herein described process of purifying a flowing stream of ammonia liquor consisting in raising the temperature of separate portions of said stream to unequal heat increasing in the direction of flow and thereby evolving carbonic anhydride and sulphureted gases from the warmer portion, then passing the evolved gases through the cooler portions of said liquor for preventing the escape of ammonia, evolving similar gases from said cooler portions, passing said gases through an independent cooler portion of said liquor, distilling the purified liquor, and finally passing the heated vapors thereof in proximity to and in a direction opposite to the flow of said stream of liquor for heating the same unequally, as and for the purpose above set forth.

2. The herein described process of purifying a flowing stream of ammonia liquor, the same consisting in raising the temperature of separate portions of said stream of ammonia liquor to unequal heat increasing in the direction of the flow and thereby evolving carbonic anhydride and sulphureted gases from the warmer portion, then passing the evolved gases through the remaining and cooler portions of said ammonia liquor for preventing the escape of ammonia, and finally distilling said purified liquor and passing the heated vapors thereof in proximity to and in a direction opposite to the flow of said stream of liquor for heating the portions thereof to unequal degrees as set forth, substantially as described.

In testimony whereof I have hereunto signed my name, in the presence of two attesting witnesses, at the city of Brussels, Belgium, this 12th day of August, 1889.

ERNEST SOLVAY.

Witnesses:
ADOLF STEIN,
R. LUCON.

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

PROCESS OF PURIFYING AMMONIA.

SPECIFICATION forming part of Letters Patent No. 518,428, dated April 17, 1894.

Application filed December 7, 1889. Serial No. 332,923. (No specimens.) Patented in Belgium October 19, 1888, No. 83,661; in Germany November 4, 1888, No. 49,500; in France April 15, 1889, No. 197,483, and in England May 16, 1889, No. 8,169.

*To all whom it may concern:*

Be it known that I, ERNEST SOLVAY, a subject of the King of Belgium, residing at Brussels, Belgium, have invented a new and useful Process of Concentrating Ammonia, (for which I have obtained Letters Patent in the following countries, to wit: Belgium, No. 83,661, dated October 19, 1888; France, No. 197,483, dated April 15, 1889; Germany, No. 49,500, dated November 4, 1888, and Great Britain, No. 8,169, dated May 16, 1889,) of which the following, taken in connection with the accompanying drawing, is a full, clear, and exact description.

My invention relates to improvements in the process of distilling ammonia liquor and has for its object a simple and effective method of separating from said liquor the various gases present as impurities, and then concentrating said liquor, and producing one containing a high percentage of ammonia, all as hereinafter more fully described and pointed out in the claims.

In describing my invention, reference is had to the accompanying drawing, illustrating an apparatus suitable for carrying out my process, which forms the subject matter of an application of even date herewith.

In this construction, —A— represents the still, —B— the separator, —D— a condenser and heater, —F— a receiver for the distilled causticized liquor, and —G— a tank or reservoir for the weak ammonia liquor, all of these parts being shown in vertical section with the exception of the still which is shown in elevation.

In the distillation of ammonia liquor at the present time, the still is fed directly with weak ammonia liquor, either cold or hot, by the passage through a condenser of the products of combustion, or by a separate heater, but my process is radically different from these previous methods, in that, before its passage to the still, the ammonia liquor is first deprived of the whole or a major part of the contained carbonic anhydride $CO_2$ and sulphureted hydrogen $H_2S$ and that then the distilled vapors are utilized to heat the incoming or feeding ammonia liquor; thereby effecting the cooling and condensation of said vapors, and also the separation from the incoming ammonia liquor of the carbonic anhydride and the sulphureted hydrogen gases.

In order that my invention may be clearly understood, I will now proceed to briefly describe the apparatus illustrated in the drawing to which, it will be understood, I do not, in any way, limit my present invention, since the same may be carried out in other suitable apparatus.

—A— is the still which is of any suitable form, size and construction, and —a— is an inlet pipe discharging into the still —A—, the ammonia liquors which have been previously conducted from the tank or reservoir —G— through the condenser and heater —D— and the separator —B—.

—a'— is an outlet pipe for discharging the distilled vapors from the still —A— into the base of a separator or column —B— which may also be of any suitable form and construction, and may be composed of any desirable material.

—b—b'—b²—b³—b⁴— are chambers in the separator —B— formed by division plates —b⁵— arranged within the separator at intervals and —c—c'—c²—c³—c⁴— are coiled pipes or flues arranged within the chambers —b—b'—b²—b³—b⁴— and connected together by elbows —C— formed with enlargements or chambers —R—.

—j— represents overflow pipes or tubes connecting the chambers —b—b'—b²—b³—b⁴— for conducting the ammonia liquor successively through the chambers —b⁴—b³—b²—b'—b—, and —j'— is a pipe opening from the outlet liquor chamber,—b— of the separator and discharging into the inlet pipe —a— of the still —A—.

—1—1— are gas tubes extending upwardly from the chambers —b—b'—b²—b³— into the chambers —b'—b²—b³—b⁴— and —2—2— are passettes or caps arranged over the outlet end of said outlet tubes —1—1—.

—C'—C'— are pipes having their upper ends opening from the enlargements or chambers —R— of the elbows —C— and their lower extremities discharging into the inlet liquor pipe —a— of the still —A— for conducting to said inlet pipe the condensed vapors which accumulate in said elbows —C—.

—D— is a condenser and heater which is of suitable construction and is formed with a series of chambers —d—d'—d²— connected by overflows —c⁶—, and —c⁵— is a pipe that connects the vapor pipe or flue —c⁴— in the inlet liquor chamber —b— of the separator —b⁴— with the outlet liquor chamber —d— of the condenser and heater —D—.

—f— is a pipe opening from the outlet vapor chamber of the condenser and heater —D—, and —F— is a receiver which is of desirable form, size and construction and receives the distilled condensed ammonia vapors conducted through the pipe —f—.

—g'—g²—g³— are connected coiled pipes or tubes arranged within the chambers —d— d'—d²— of the condenser and heater and —G— is a reservoir or tank for the raw or weak ammonia liquor which is conducted from said reservoir by a pipe —g— to the pipe or tube —g'— within the inlet liquor chamber —d²— of the condenser and heater —D—.

Connected to the outlet of the pipe or tube —g³— arranged in the outlet liquor chamber —d— of the condenser and heater —D— is a pipe —h— which projects beyond the condenser and heater —D— and discharges into a receptacle —H— in a plane between the top and bottom sides thereof, so as to constantly pass the weak or raw ammonia liquor from said pipe or tube —g³—into said receptacle —H— and cause said receptacle to become a washer or bath, as will be hereinafter set forth.

—J— is a pipe having one end opening from the receptacle —H— at a point sufficiently high to allow of a constant depth of weak ammonia liquor therein, and having its other extremity discharging into the inlet liquor chamber —b⁴— of the separator —B—.

—3— is a pipe having one end opening from the top of the inlet liquor chamber —b⁴— of the separator —B— and the other discharging into the washer —H— at a plane beneath the level of the liquor therein; and —4— is an outlet pipe opening from the top of the washer —H—. It is therefore evident that the chambers —b⁴—b³—b²—b'—b— and the overflows —j— form an incoming conduit in the separator —B— through which passes an incoming current of ammonia liquor and that the coiled pipes or flues —c—c'—c²—c³—c⁴— arranged in the chambers —b—b'—b²—b³—b⁴— and the elbows —C— form an outgoing conduit for the distilled ammonia vapors. It is also evident that the pipes or tubes —g'—g² —g³— of the condenser and heater form an incoming conduit through which a current of raw ammonia liquor passes through the condenser and heater to the washer —H— and thence to the incoming conduit of the separator, and that the chambers —d—d'—d²— of the condenser and heater which contain respectively, the pipes or tubes —g³—g²—g'— and the overflow pipes or tubes —c⁶— connecting the chambers —d—d'—d²— form an outgoing conduit through which passes an outgoing current of the vapors discharged from the outgoing conduit of the separator.

I have ascertained the fact that, by subjecting to different temperatures separate portions of a flowing stream of ammonia liquor containing carbonic anhydride and sulphureted hydrogen gases, these gases are evolved from the warmer liquor; and that by passing the gases evolved from the warmer liquor through the cooler liquor, a greater or less amount of the ammonia also evolved from the the warmer liquor at the same time that said gases are evolved, is absorbed by the cooler liquor, and is prevented from escapement; and that by passing the gases evolved from the cooler portion of the liquor through a portion thereof of substantially normal temperature, a still greater amount of ammonia is absorbed by the liquor of normal temperature; and that consequently, the purified liquor is rich in ammonia.

The described apparatus is particularly effective in carrying out this process. Upon reference to the drawing and the foregoing description, it will be readily understood that the weak ammonia liquor flows from the tank or reservoir —G— through the pipe —g— into the coiled pipes or tubes —g'—g²—g³— thence through the pipe —h— into the washer —H— and through the pipe —J— into the inlet liquor chamber —b⁴— of the separator —B— whence the liquor successively passes through the remaining chambers —b³— b²—b'—b— of said separator to the inlet pipe —a— and thence into the still —A—. It will also be understood that the distilled vapors pass from the still —A— through the pipe —a'— to the pipe —c— in the outlet chamber —b— of the separator —B—; and thence successively through the pipes or flues —c'—c²—c³—c⁴— arranged, respectively, in the chambers —b'—b²—b³—b⁴— of the separator —B—, then through the pipe —c⁵— to the outlet liquor chamber —d— of the condenser and heater, whence said vapors pass successively through the chambers —d'— d²— of the condenser and heater and are finally conducted by the pipe —f— to the receiver —F—. The distilled ammonia liquors are considerably condensed by their passage through the pipes or flues —c—c'—c²—c³— c⁴— in the separator —B— and heat the chambers —b—b'—b²—b³—b⁴— containing said pipes —c—c'—c²—c³—c⁴— to different temperatures; and said ammonia vapors are further condensed within the chambers —d— d'—d²— of the condenser and heater —D—. The stream of weak ammonia liquor flowing through the pipes or tubes —g'—g²—g³— in the condenser and heater —D— is slightly raised in temperature and after its passage from the washer —H—, is by the chambers —b⁴—b³—b²—b'—b— divided by the el- (No Model.)
E. SOLVAY.
APPARATUS FOR CAUSTICISING AMMONIA LIQUOR.
No. 518,429. Patented Apr. 17, 1894.
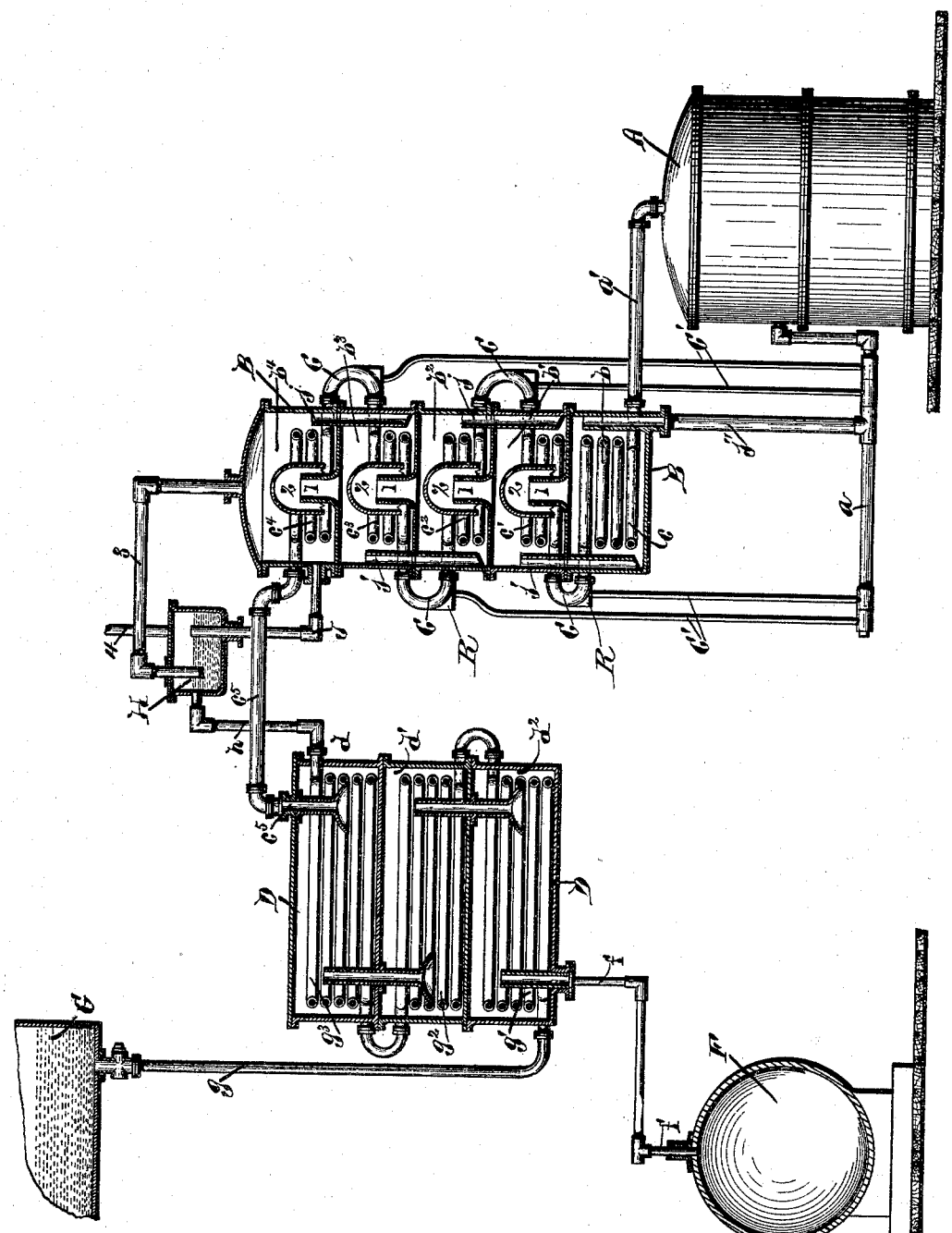
WITNESSES:
INVENTOR
Ernest Solvay
BY
George W. Frey
ATTORNEY